April 21, 1953 A. R. MAIER 2,635,851
COMBINED CLUTCH AND BRAKE FOR DRAWWORKS HOISTS
Filed Feb. 24, 1947
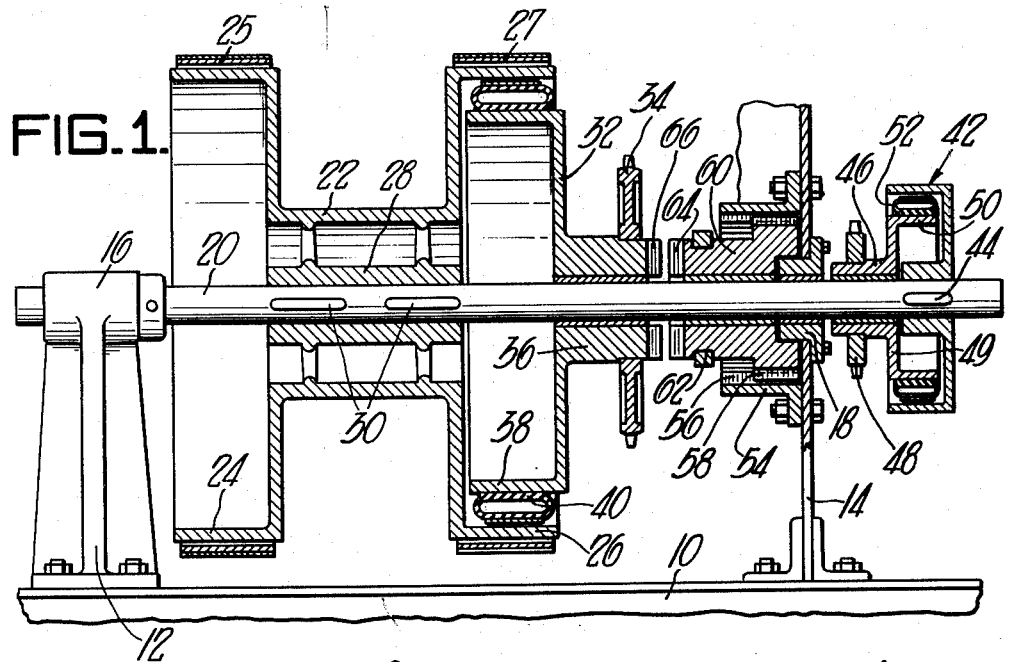
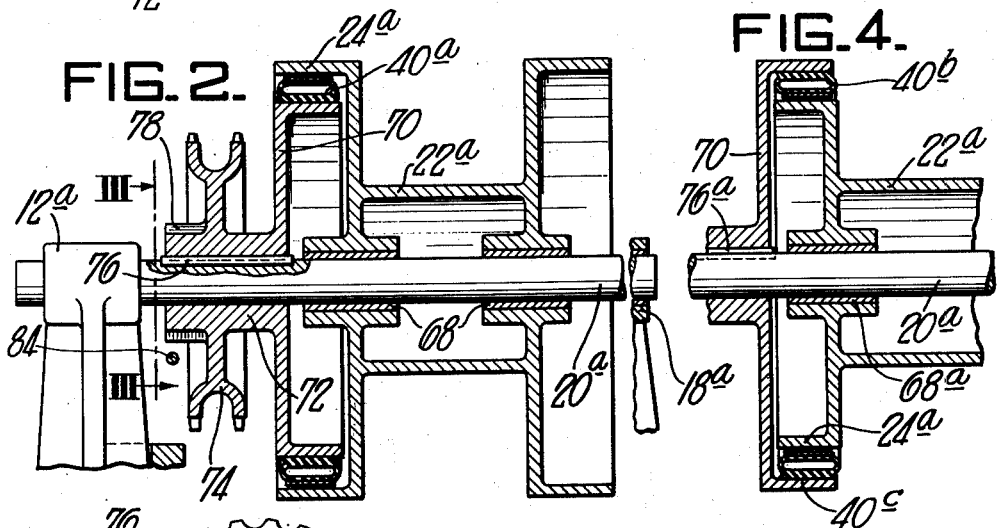
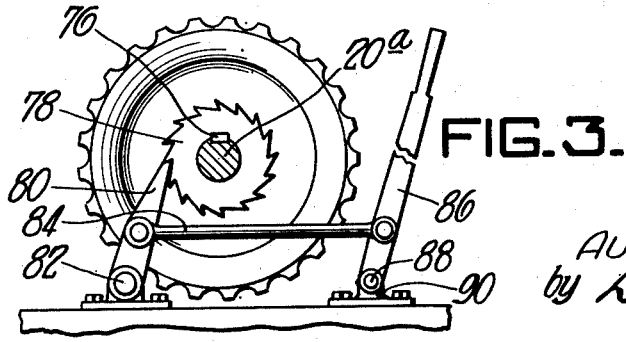
Inventor:
AUGUST R. MAIER,
by Donald G. Dalton
his Attorney.

Patented Apr. 21, 1953

2,635,851

UNITED STATES PATENT OFFICE 2,635,851

COMBINED CLUTCH AND BRAKE FOR DRAWWORKS HOISTS

August R. Maier, Oil City, Pa., assignor to United States Steel Corporation, a corporation of New Jersey Application February 24, 1947, Serial No. 730,396

4 Claims. (Cl. 254—187)

The present invention relates to improved features of structure and arrangement of combined clutching and braking elements adapted for use in conjunction with the hoisting drum of an oil well drawworks. The combined unit is designed, constructed and arranged to function either as a clutch to transmit power to the drum when hauling in rope to hoist tools and pipe, or to control the speed of rotation of the drum when paying out rope to lower said tools and pipe into the oil well.

For a full understanding of the invention reference should be made to the following detailed disclosure, the accompanying drawings and the appended claims.

In the drawings:

Figure 1 is a longitudinal section through the hoisting drum and related sprockets and clutches showing enough of a drawworks to illustrate the present invention;

Figure 2 is a longitudinal section similar in some respects to Figure 1 showing an alternative embodiment of the invention;

Figure 3 is a transverse section on line III—III of Figure 2; and

Figure 4 is a fragmentary detail showing a modification adapted for incorporation in the embodiments of the invention shown in either Figure 1 or 2.

In an oil field drawworks hoist of conventional design it is known to those skilled in the art that where the hoisting rope drum is driven through a gear or chain transmission, the drum is usually driven by transmission mechanism through one or more jaw type or friction type clutches, and the braking action on the drum is usually accomplished by means of one or two band type brakes applied to brake flanges secured to the hoisting drum. Other types of brakes are also used, but in all conventional oil field drawworks, to the best of my knowledge, it has been the usual custom, prior to my invention, to employ separate clutches and separate brakes. According to my present invention, as hereinafter pointed out in greater detail, I provide one single compact unit constructed and arranged to function either as a clutch or a brake, thereby eliminating many parts required in prior art conventional constructions, thus reducing the over-all cost and cutting down the weight and providing more compact design and decreasing the number of parts subject to wear. Thus under the invention I secure a compact simplified design and lessen the weight of parts. This has the advantage of endowing the new unit with increased portability and also makes the hoist easier to handle in the field when transferring drilling operations from one location to another.

Referring first to the embodiment of the invention illustrated in Figure 1, 10 represents a suitable supporting base which supports fixed structures 12 and 14 carrying suitable bearings 16 and 18 in which the drum shaft 20 is journalled. In this embodiment of the invention I provide a hoisting drum 22 which is adapted to haul in or pay off rope, reeved over an overhead sheave, not shown, for either lifting or lowering well drilling tools and oil well casing pipe. The drum will usually be equipped with conventional brake flanges 24 and 26 which cooperate with conventional auxiliary band brakes 25 and 27. The hub 28 of the drum in this embodiment of the invention is made to rotate with the shaft 20 by means of suitable keys 30 as shown.

Supported by but rotatable with respect to the shaft 20, in this embodiment of the invention, I provide a clutch member 32 having a low speed sprocket 34 secured to its hub 36, this sprocket being adapted to be driven by a chain through a suitable speed change transmission of conventional form forming no part of this invention and thus not shown. The clutch member 32 has a peripheral flange 38 with a rubber or other inflatable element 40 bonded thereto. When this element 40 is fully inflated, a positive driving connection is established from the sprocket 34 through the flange 38 and thus to the brake drum. Such full inflation of the element 40 is effected when it is desired to use the drum for hauling in the rope and winding it on the drum and thus lifting the well drilling tools and the oil well casing pipe.

The shaft 20 also carries a high speed clutch element 42 secured by a key 44 to the shaft. Loosely mounted on the shaft there is provided a high speed clutch member 46 having a high speed sprocket 48 secured to the hub 46 of a coacting clutch member 49 formed with an annular flange 50 which carries an inflatable element 52 adapted when expanded to transmit the driving torque from the sprocket 48 to the clutch member 42 and thence through shaft 20 to the hoisting drum.

In order to enable the single unit shown to function either as a clutch or brake I provide a member 54 rigidly secured to the fixed hoist frame 14 or any other stationary element. This member 54 is equipped with splines 56 which are constructed and arranged for slidable engagement with longitudinally extending teeth 58 formed on a brake clutch member 60 which is grooved at 62 for coaction with a yoke-like operating member effected to slide said member 60 longitudinally of the shaft 20. The member 60 is equipped with clutch jaws 64 adapted to be engaged with or disengaged from coacting clutch teeth 66 formed on the hub 36 of the clutch member 32.

When it is desired to utilize the unit shown for braking purposes, the clutch member 60 will be shifted to the left in Figure 1 so as to engage the teeth 64 with the teeth 62 and thus lock the sprocket 34 against rotation. With the parts so locked the inflatable element 40 may be partially inflated and in this way a variable braking action may be exerted on the flange 26 of the hoist drum to thus control the rate at which the rope is payed off from the drum when lowering tools and pipe casing. The inflatable member 40 may take the form of a known conventional type of air actuated clutch member. Or instead of using such an inflatable member a cone or friction disc or any other conventional form of clutch-like connection may be substituted.

In the modification of Figures 2 and 3 I have shown a hoisting drum 22a which is rotatably mounted on sleeve-like bearings 68 carried by the shaft 20a, this shaft being journalled in suitable bearings 12a and 18a. In this modification the flange 24a of the drum is adapted to coact with an inflatable element 40a secured to a combined clutch and brake control member 70 of which there is secured a sprocket 74 secured by a key 76 or other conventional securing means to the shaft 20a. The sprocket 74 has a ratchet 78 secured thereto and coacting with this ratchet there is a pawl 80 pivoted at 82, the pawl being connected by a link 84 with a manually operable lever 86 pivoted at 88 to a suitable bracket 90 secured to any fixed part of the drawworks or hoist base. In this embodiment of the invention when the drum is used for winding up the rope to hoist the drilling tools and casing pipe out of the well, the pawl 80 will be disengaged from the ratchet 78 and the inflatable clutch element 40a will be fully inflated so as to thus transmit the rotary motion imparted to the sprocket 74 directly to the drum 22a through the flange 24a thereof. When it is desired to pay off rope from the hoisting drum, the pawl 80 will be manually shifted to the position shown at Figure 3 thus locking the sprocket against rotation. Under these conditions clutch element 40a will be only partially inflated thus functioning as a manually controlled brake to permit a relative slippage between the clutch member and the flange member 24a thereby controlling the payoff of rope during the act of lowering the tools and casing pipe to the well.

In the description in connection with Figures 1 and 2 the respective inflatable clutch elements have been shown as secured to and moving to the outer peripheral faces of the flanges of the members 32 and 70. It is to be understood, however, instead of being secured to such outer faces of the member, this inflatable member can be secured, for example, to the inner face of the peripheral flange of the member 70, as shown in Figure 4, wherein the inflatable member 40b is shown as secured at 40c to the inner face of the flanged member 70 and to make a sliding or frictional engagement with the peripheral flange 24a of the drum 22a.

While I have shown and described quite precisely two preferred embodiments of the invention, it is to be understood that the drawings and detailed disclosure are to be construed in an illustrative rather than a limiting sense since various modifications and substitutions of equivalents may be made by those skilled in the art within the spirit and scope of the invention as defined in the appended claims.

I claim:

1. A drawworks comprising a framework which includes a base structure and a pair of spaced apart bearing elements carried by said base structure, a shaft rotatably supported in said bearing elements, a hoist drum mounted on said shaft and adapted to rotate in one direction to haul in rope and in the opposite direction to pay out rope, an annular flange fixed to one end of said drum, a clutch member mounted on said shaft and being rotatable relative to said drum, an annular flange fixed to one end of said clutch member and nesting with said first named flange, an annular inflatable element carried by said second named flange and adapted to engage said first named flange, a drive sprocket fixed to said clutch member and adapted to transmit a driving torque via said flanges and inflatable element when inflated to said drum for hauling in rope, a plurality of teeth carried by said clutch member, and a releasable latching device carried by said framework and adapted to engage said teeth for positively holding said clutch member against rotation in the pay out direction, said inflatable element being adapted to act as a brake for said drum when said latching device is engaged.

2. A drawworks as defined in claim 1 in which said teeth are clutch teeth on the opposite end of said clutch member from said second named flange and said latching device is a jaw clutch slidably mounted on one of said bearing elements and rotatably receiving said shaft, said jaw clutch having a splined connection with the bearing element on which it is mounted fixing it against rotation and having teeth adapted to engage said first named teeth.

3. A drawworks as defined in claim 1 in which said teeth are ratchet teeth and said latching device is a pawl pivotally mounted on said base structure and engageable with said ratchet teeth.

4. A drawworks comprising a pair of spaced apart bearing elements, a shaft rotatably supported in said bearing elements, a hoist drum fixed to said shaft and adapted to rotate in one direction to haul in rope and in the opposite direction to pay out rope, an annular flange fixed to one end of said drum, a clutch member mounted on said shaft for rotation relative thereto, an annular flange fixed to one end of said clutch member and nesting with said first named flange, an annular inflatable element carried by said second named flange and adapted to engage said first named flange, a drive sprocket fixed to said clutch member and adapted to transmit a driving torque via said flanges and inflatable element when inflated to said drum for hauling in rope, clutch teeth fixed to the other end of said clutch member, a jaw clutch slidably mounted on one of said bearing elements and rotatably receiving said shaft, a spline connection between the bearing element and the jaw clutch fixing the latter against rotation, and clutch teeth fixed to one end of said jaw clutch and adapted to engage said first named clutch teeth, said inflatable element being adapted to act as a brake for said drum for paying out the rope when said clutch teeth are engaged with each other.

AUGUST R. MAIER.

References Cited in the file of this patent

UNITED STATES PATENTS

| Number | Name | Date |
|---|---|---|
| 88,069 | Palmiter | Mar. 23, 1869 |
| 110,521 | Waterbury | Dec. 27, 1870 |
| 792,567 | Wright | June 13, 1905 |
| 1,555,311 | Park et al. | Sept. 29, 1925 |
| 1,677,338 | Hale | July 17, 1928 |
| 1,936,713 | Freeman et al. | Nov. 28, 1933 |
| 2,357,462 | Ferguson | Sept. 5, 1944 |
| 2,536,483 | Young | Jan. 2, 1951 |